D. B. KENNEY.
SHARPENING DEVICE FOR LAWN MOWERS.
APPLICATION FILED DEC. 10, 1907.
907,245.
Patented Dec. 22, 1908.
2 SHEETS—SHEET 2.
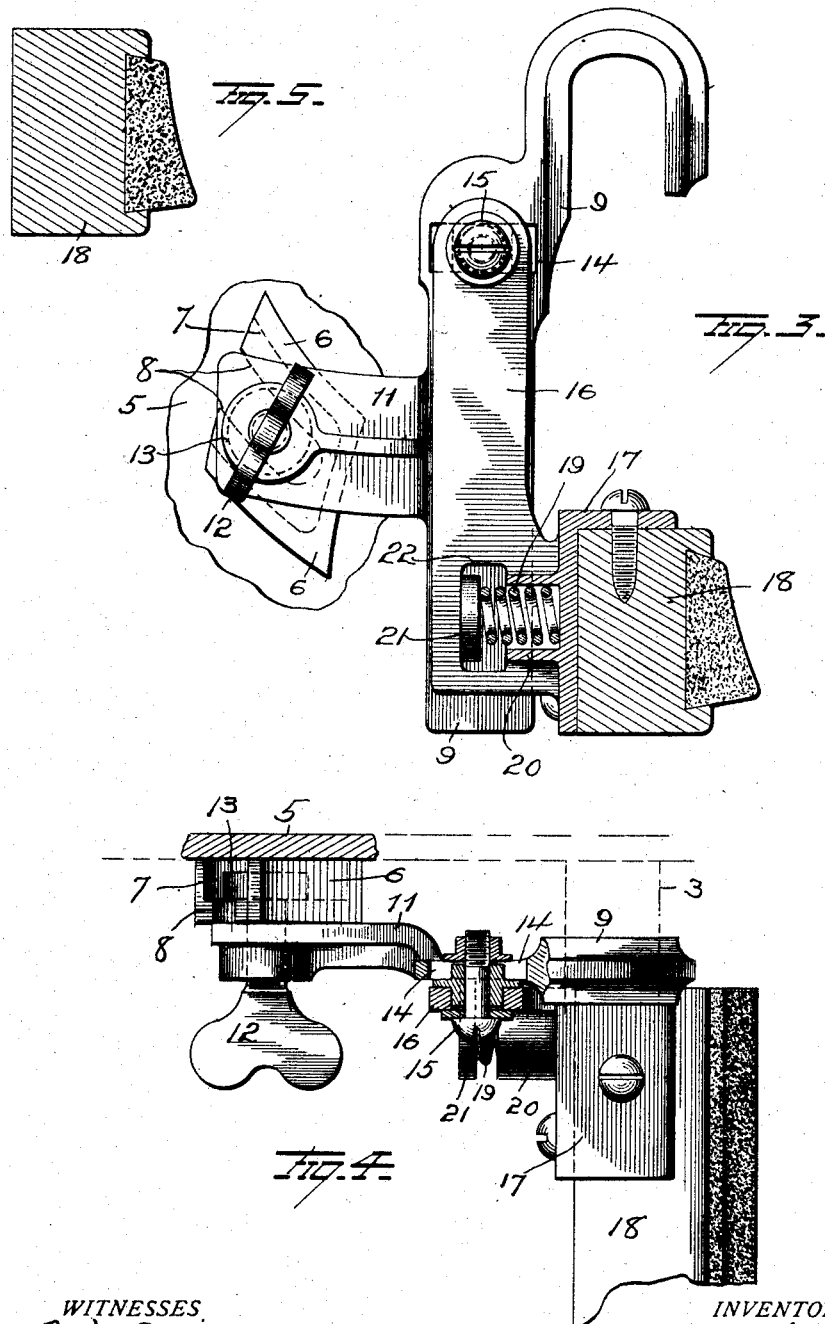
WITNESSES
E. A. Nottingham
G. F. Downing
INVENTOR
D. B. Kenney
By H. A. Seymour
Attorney

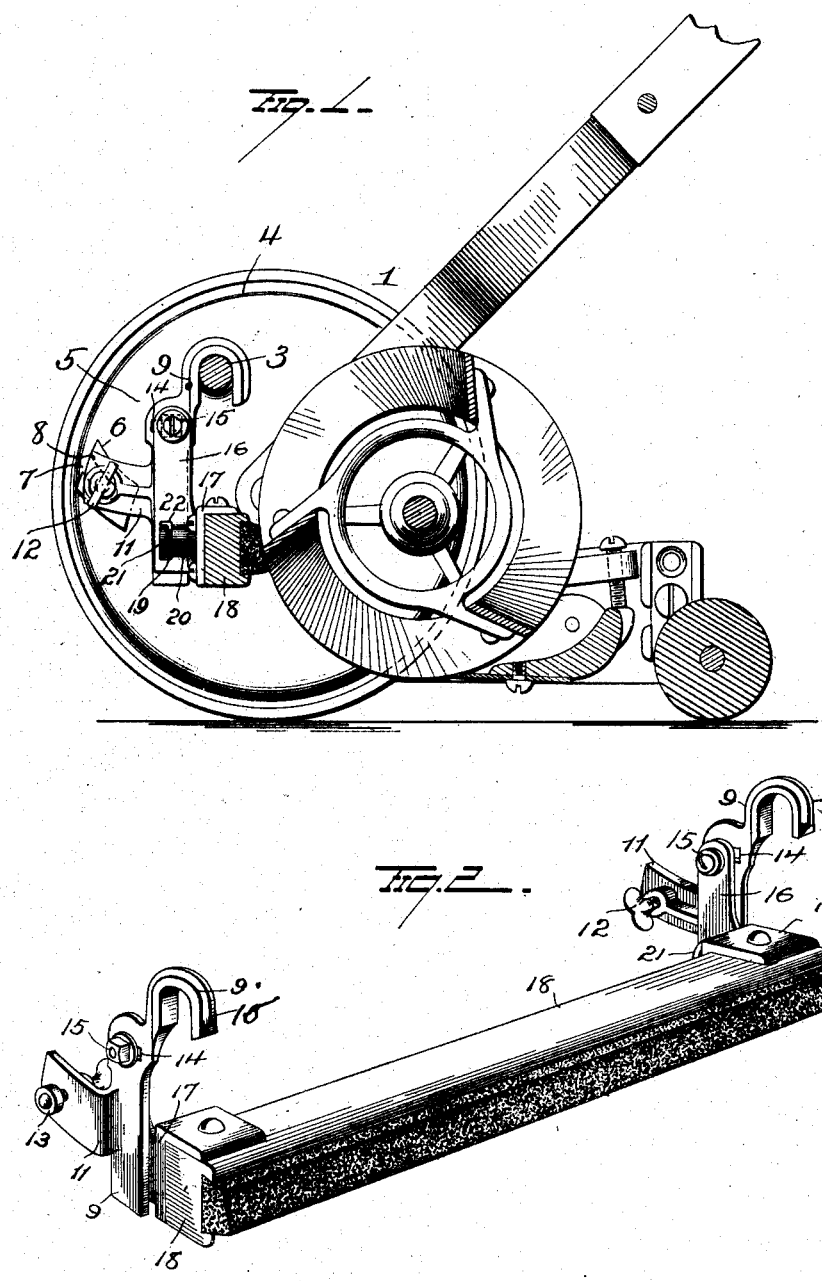

UNITED STATES PATENT OFFICE.

DANIEL B. KENNEY, OF HUNTINGTON, WEST VIRGINIA.

SHARPENING DEVICE FOR LAWN-MOWERS.

No. 907,245.　　　　Specification of Letters Patent.　　　Patented Dec. 22, 1908.

Application filed December 10, 1907. Serial No. 405,885.

*To all whom it may concern:*

Be it known that I, DANIEL B. KENNEY, of Huntington, in the county of Cabell and State of West Virginia, have invented certain new and useful Improvements in Sharpening Devices for Lawn-Mowers; and I do hereby declare the following to be a full, clear, and exact description of the invention, such as will enable others skilled in the art to which it appertains to make and use the same.

My invention relates to an improvement in sharpening devices for lawn mowers, the object being to provide a device which can be readily and quickly applied to a mower and adjusted to the cutters thereof, and which operates to sharpen the cutters while the latter are moving in the cutting direction.

With these ends in view my invention consists in the parts and combination of parts as will be more fully described and pointed out in the claims.

In the accompanying drawings, Figure 1 is a view of a mower showing my improvement applied thereto. Fig. 2 is a view of the attachment removed. Fig. 3 is a view of one of the brackets and hangers; Fig. 4 is a view of one section of one of the cheek pieces, and Fig. 5 is a view in cross section of the bar and abrading or sharpening strip carried thereby.

1 represents the lawn mower which may be of any make or design using spiral knives. This mower is provided with a rod 3 connecting the side frames 4, each of which is provided on its inner cheek 5, with an outwardly projecting lug 6 having a recess 7 open at the front, and a slot 8, the latter also open at the front, and communicating with the recess. Many if not all the machines now in use have the rod 3 connecting the side frames, hence the only addition to the mowers, in order to adapt my improvement thereto, is the slotted and recessed lugs on the cheek pieces of the side frames. Instead of providing the cheek pieces with integral lugs, the latter may be formed on a strip or block and the latter be rigidly or removably secured against the cheek pieces.

9 represents brackets provided with hook shaped upper ends 10, which latter are adapted to hook over rod 3 and support the sharpening device in front of the cutters. Each bracket 9 is provided with a forwardly extending integral arm 11 provided near its free end with a threaded hole for the passage of the thumb screw 12. Each thumb screw carries on its outer end, a loose washer 13, which when the device is in operation, rests in the recess 7 while the screw 12 passes through the slot 8 in lug 6. With the parts so placed, by tightening up on the screws, the washers clamp the walls of the recess and lock the two brackets in place.

The brackets 9 are provided near their upper ends with slots 14, in which are adjustably mounted screws 15 carrying the hangers 16. Each hanger is enlarged at its lower end, and each enlarged end is provided with rearwardly projecting flanges 17 to which the bar 18 is secured by screws or otherwise, the bar securely connecting the two hangers 16, and the brackets 9 carrying the hangers.

The bar 18 which may be of wood or metal is provided on its rear face, with a dovetailed groove in which is mounted and secured a strip of emery or other suitable abrading substance. The rear or exposed face of the emery strip, is preferably curved in an arc conforming to the circle through which the edges of the knives or cutters move, though this is not essential as it is simply necessary that the cutters engage the emery strip throughout their entire lengths so as to be sharpened from end to end, and need not necessarily make contact with the emery strip throughout the width of the latter, as they would, if the emery strip were curved in an arc concentric with the circle through which the edges of the cutters move. The emery strip should be as long as the cutters, and is held in yielding contact therewith by the springs 19 resting in recessed seats 20 formed integral with the hangers 16, and bearing at their outer front ends against the tongues 21 integral with the brackets 9, and projecting inwardly through slots 22 in the hangers.

With the brackets mounted on rod 3 and locked by the set screws to the cheek pieces, it will be seen, that, the springs bearing against the fixed tongues 21 yieldingly force the bar 18 rearwardly thus holding the emery strip in a position to be engaged by the cutters as the latter revolve.

In the operation of the device, hooks 10 of brackets 9 are placed over rod 3, and the washers on the ends of the set screws entered into the recesses in the cheek pieces and secured as above explained. If with the device thus applied to a mower, the emery or other sharpening strip, does not engage the cutters throughout the entire lengths of the latter, or if the emery strip, should bear with greater pressure at one end than at the other, this defect can be remedied by loosening up one or both screws connecting the hangers to the brackets and adjusting the screws in their slots, until the emery strip bears evenly against the cutters throughout the length of the latter.

This sharpener may be sold attached to the mower and after it has been once adjusted to the cutters thereof, no future adjustments will be required providing, when subsequently applied, it be properly secured in place.

When applied to the mower and the latter moved, as in cutting, the cutters will be revolved in contact with the emery strip and be thoroughly and evenly sharpened in a few seconds' time. After the cutters have been sharpened, the sharpener should be removed, and not be re-applied until it is again desired to sharpen the cutters.

It is evident that many slight changes might be resorted to in the relative arrangement of parts shown and described without departing from the spirit and scope of my invention hence I would have it understood that I do not restrict myself to the exact construction of parts shown and described, but, Having fully described my invention what I claim as new and desire to secure by Letters-Patent, is:—

1. In a sharpener for lawn mowers, the combination with brackets, each provided with means for connecting the same at two places to the frame of a mower, hangers attached to said brackets and a sharpening strip carried by said brackets.

2. In a sharpener for lawn mowers the combination of brackets, each provided with a part to engage the frame of a mowing machine, an arm projecting from each bracket, means for adjustably securing each of said arms to the frame of the mower, hangers attached to said brackets, and a sharpening strip carried by said hangers.

3. In a sharpener, the combination of brackets, each provided with means for loosely engaging the frame of a mower, arms projecting laterally from said brackets, means for adjustably securing said arms to the frame of the mower, hangers adjustably attached to said brackets, a sharpening strip carried by said hangers, and springs interposed between said hangers and brackets.

4. In a sharpener for lawn mowers, the combination with brackets and means for adjustably securing same to a mower frame, of hangers adjustably secured to said brackets, springs interposed between the hangers and brackets, a bar carried by the hangers, and an abrading or sharpening strip carried by said bar.

5. In a sharpener for lawn mowers, the combination with brackets having hook shaped upper ends and means on said brackets for engaging the cheek pieces of the side frames or housings of the mower, of hangers adjustably secured to the brackets, springs interposed between the brackets and hangers, a bar carried by the hangers and an abrading or sharpening strip carried by the bar.

In testimony whereof, I have signed this specification in the presence of two subscribing witnesses.

DANIEL B. KENNEY.

Witnesses:
OLEY DAVIES,
N. W. YATES.